(12) United States Patent
Ntoulas et al.

(10) Patent No.: US 10,315,116 B2
(45) Date of Patent: Jun. 11, 2019

(54) DYNAMIC VIRTUAL ENVIRONMENT CUSTOMIZATION BASED ON USER BEHAVIOR CLUSTERING

(71) Applicant: Zynga Inc., San Francisco, CA (US)

(72) Inventors: Alexandros Ntoulas, San Jose, CA (US); Moises Goldszmidt, Moss Beach, CA (US); Xuyang Tan, Fremont, CA (US); Yuanli Pei, Corvallis, OR (US)

(73) Assignee: Zynga Inc., San Francisco, CA (US)

( * ) Notice: Subject to any disclaimer, the term of this patent is extended or adjusted under 35 U.S.C. 154(b) by 63 days.

(21) Appl. No.: 15/288,851

(22) Filed: Oct. 7, 2016

(65) Prior Publication Data

US 2017/0100674 A1    Apr. 13, 2017

Related U.S. Application Data

(60) Provisional application No. 62/239,184, filed on Oct. 8, 2015.

(51) Int. Cl.
*A63F 13/825* (2014.01)
*A63F 13/795* (2014.01)
(Continued)

(52) U.S. Cl.
CPC ............ *A63F 13/795* (2014.09); *A63F 13/30* (2014.09); *A63F 13/358* (2014.09)

(58) Field of Classification Search
CPC ........ A63F 13/825; A63F 13/56; A63F 13/69; A63F 13/847; A63F 13/33; A63F 13/58;
(Continued)

(56) References Cited

U.S. PATENT DOCUMENTS

2013/0325782 A1\* 12/2013 Fujimaki ................. G06N 5/02
706/46
2014/0025807 A1\* 1/2014 Wiener ................ G06F 15/173
709/224
(Continued)

OTHER PUBLICATIONS

Bicego, Manuele, et al., "Similarity-based clustering of sequences using hidden markov models", Lecture Notes in Computer Science, vol. 2734. In Machine learning and data mining in pattern recognition (Lecture Notes in Artificial Intelligence), Springer Berlin Heidelberg, (2003), 86-95.

(Continued)

*Primary Examiner* — Michael A Cuff
(74) *Attorney, Agent, or Firm* — Schwegman Lundberg & Woessner, P.A.

(57) ABSTRACT

A system, a machine-readable storage medium storing instructions, and a computer-implemented method are described herein for a Clustering Engine that determines that respective actions, performed in a first instance of a virtual environment by a first user during a first time range, correspond with a first latent state. The Clustering Engine determines that respective actions, performed in a second instance of the virtual environment by a second user during the first time range, correspond with a second latent state. The Clustering Engine triggers a first virtual environment feature based on a first latent state parameter space for the first user. The Clustering Engine triggers a second virtual environment feature based on a second latent state parameter space for the second user.

20 Claims, 9 Drawing Sheets

(51) Int. Cl.
  *A63F 13/358* (2014.01)
  *A63F 13/30* (2014.01)
(58) Field of Classification Search
  CPC .......... A63F 13/61; A63F 13/31; A63F 13/32; A63F 2300/8082
  USPC .......................................................... 463/43
  See application file for complete search history.

(56) References Cited

U.S. PATENT DOCUMENTS

| | | | | |
|---|---|---|---|---|
| 2014/0343903 | A1* | 11/2014 | Fujimaki | G06F 17/18 703/2 |
| 2014/0355447 | A1* | 12/2014 | Gohite | H04W 40/34 370/236 |
| 2015/0120638 | A1* | 4/2015 | Muraoka | G06N 7/005 706/52 |
| 2015/0170536 | A1* | 6/2015 | Lan | G09B 7/02 434/350 |
| 2017/0161628 | A1* | 6/2017 | Chiba | G06N 7/005 |

OTHER PUBLICATIONS

Bicego, Manuele, et al., "Unsupervised scene analysis: A hidden markov model approach", Computer Vision and Image Understanding, 102(1), (2006), 22-41.

Coviello, Emanuele, et al., "Clustering hidden markov models with variational hem", The Journal of Machine Learning Research, 15(1), (2014), 697-747.

Davies, David L, et al., "A cluster separation measure", IEEE Transactions on Pattern Analysis and Machine Intelligence, vol. 02, (1979), 224-227.

Escobar, Michael D, et al., "Bayesian density estimation and inference using mixtures", Journal of the american statistical association, 90(430), (1995), 577-588.

Escobar, Michael D, "Estimating normal means with a dirichlet process prior", Journal of the American Statistical Association, 89(425), (1994), 268-277.

Menedez, Hector D, et al., "Combining time series and clustering to extract gamer profile evolution", In Computational Collective Intelligence, Technologies and Applications, Springer, (2014), 262-271.

Neal, Radford M, "Markov chain sampling methods for dirichlet process mixture models", Journal of computational and graphical statistics, 9(2), (2000), 249-265.

Pei, Yuanli, et al., "Clustering Players Time-Series Data: A Case Study", 5 pgs.

Rabiner, Radford R, et al., "An introduction to hidden markov models", ASSP Magazine, IEEE, 3(1), (1986), 4-16.

Woodward, Dawn B, et al., "Online model-based clustering for crisis identification in distributed computing", Journal of the American Statistical Association, 106(493), (2011), 49-60.

* cited by examiner

| 505 | | | | | | | |
|---|---|---|---|---|---|---|---|
| Table 1: Discovered Playing States | | | | | Table 2: Clustering results. | | |
| Feature / State | Aggressive | Defensive | Moderate | | Method | #Cluster | DB |
| Prob. Pvp | 0.2472 | 0.0295 | 0.0947 | | | | |
| Prob. Pve | 0.2430 | 0.0581 | 0.1044 | | Our | 3 | 0.968 |
| Mean Points | 88.10 | 1238.36 | 476.22 | | Kmeans | 5 | 2.628 |
| Mean Session | 4.58 | 34.19 | 12.95 | | GMM | 4 | 1.803 |
| Prob. LevelUp | 0.1664 | 0.0177 | 0.0553 | | | | |
| Prob. Pay | 0.0031 | 0.0956 | 0.0320 | | | | |

DYNAMIC VIRTUAL ENVIRONMENT CUSTOMIZATION BASED ON USER BEHAVIOR CLUSTERING

CROSS-REFERENCE TO RELATED APPLICATIONS

This application claims the benefit of priority to U.S. Provisional Patent Application entitled "Triggering Features that Correspond to a User's Data Cluster," Ser. No. 62/239,184, filed Oct. 8, 2015, which is hereby incorporated herein by reference in its entirety.

TECHNICAL FIELD

The subject matter disclosed herein generally relates to the technical field of special-purpose machines that facilitate customization of user experiences, including software-configured computerized variants of such special-purpose machines and improvements to such variants, and to the technologies by which such special-purpose machines are improved compared to other special-purpose machines that facilitate the customization of user experiences.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In some embodiments, a game interface for a computer-implemented game can instead or additionally comprise an augmented reality display or a virtual reality display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 illustrates a data record listing identified latent states, according to some example embodiments.

DETAILED DESCRIPTION

Figure 1:
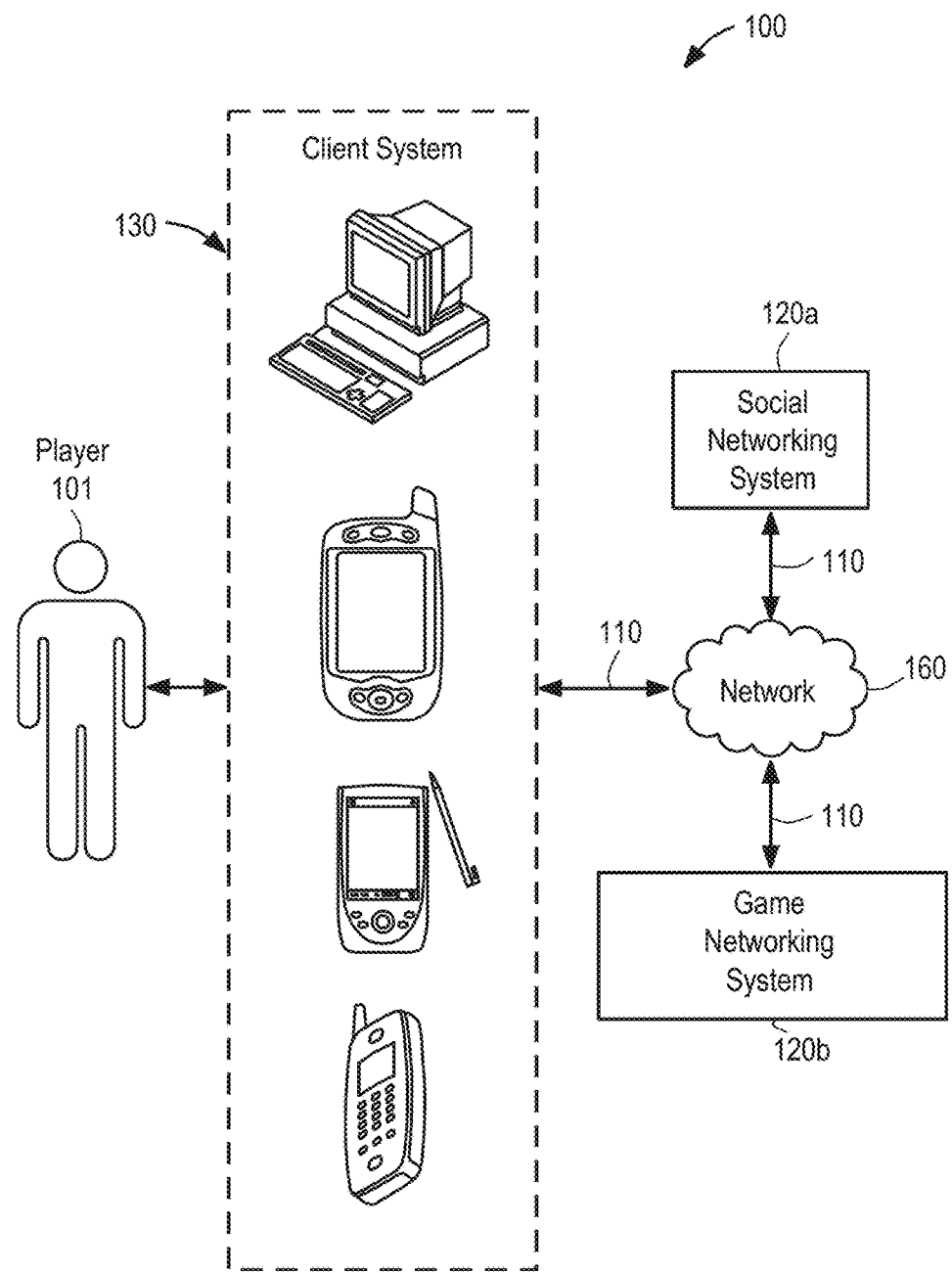
FIG. 1 is a schematic diagram showing an example of a system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter.

A system, a machine-readable storage medium storing instructions, and a computer-implemented method are described herein for a Clustering Engine. The Clustering Engine continually monitors one or more actions (such as game actions) of each of a plurality of users during a time range within a virtual environment. The Clustering Engine identifies clusters of users based on the results most commonly achieved by each of the users' actions within the virtual environment. In other words, a pre-defined latent state of each user is identified based on various type of actions performed by the user. A cluster of users may be determined as having the same latent state. For example, the Clustering Engine identifies the latent states of each player based on that player's actions during the time range. In some embodiments, identification of the latent state comprises selecting one of a plurality of predefined latent states based on the user's activities. It is understood that in some embodiments, a type of latent state corresponds to a characterization of the user's activities based on various types of actions performed by the user, or a pattern of actions performed by the user.

The Clustering Engine determines that respective actions, performed in a first instance of a virtual environment by a first user during a first time range, correspond with a first latent state. The Clustering Engine identifies the first user as having the first latent state based on the respective actions in the first instance of the virtual environment. The Clustering Engine determines that respective actions, performed in a second instance of the virtual environment by a second user during the first time range, correspond with a second latent state. The Clustering Engine identifies the second user as having the second latent state based on the respective actions in the second instance of the virtual environment.

The Clustering Engine triggers a first virtual environment feature based on a first latent state parameter space for the first user. The Clustering Engine triggers a second virtual environment feature based on a second latent state parameter space for the second user.

In various embodiments, the Clustering Engine determines that the first user's pattern of subsequent actions, in the first instance of the virtual environment during a second time range, correspond with the second latent state. Based on the pattern of the subsequent actions, the Clustering Engine triggers the second virtual environment feature based on the second latent state parameter space for the first user.

In some embodiments, the first and second time ranges are measured from when a particular user initiated installation of a game that provides an instance of the virtual environment, where the respective actions of that particular user are gameplay actions performed within the instance of the virtual environment of the game. In one example embodiment, such installation occurred on a mobile device associated with the particular user, for example. It is further understood that a first user and a second user can be a first player and a second player, respectively, of an online game.

In various exemplary embodiments, the first instance and the second instance of the virtual environment can each be an instance of an online game environment that corresponds to a particular player (or particular user). The Clustering Engine further includes one or more databases storing environment features for each type of latent state parameter space. To trigger an environment feature, the Clustering Engine accesses the one or more databases to identify a respective environment, feature to be provided to the first user and the second user based on their respective identified latent states.

It is understood that various embodiments described herein further include encoded instructions that comprise operations to generate a user interface(s) and various user interface elements related to the online game and a virtual online gaming environment. The user interface and the various user interface elements can be representative of any of the operations, data, game actions, data clusters, latent states, triggered features and various types of virtual objects and assets, as described herein. In addition, the user interface and various user interface elements are caused for display by the Clustering Engine on a computing device, a server computing device, a mobile computing device, etc.

Although the above example embodiments described as being implemented via a web browser on a client device, it is to be noted that a game display may in some embodiments be provided by a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Virtual Reality (VR), which can be referred to as immersive multimedia or computer-simulated life, replicates an environment that simulates physical presence in places in the real world or imagined worlds and lets the user interact in that world. Virtual reality artificially creates sensory experiences, which can include sight, hearing, touch, smell, taste, and more. Virtual reality environments can be displayed either on a computer screen or with special stereoscopic displays, and some simulations include additional sensory information and focus on real sound through speakers or headphones targeted towards VR users. Some advanced, haptic, systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The simulated gaming environment displayed to the user by use of a virtual reality gaming device can for some games be similar to the real world in order to create a lifelike experience, while the virtual gaming environment seemingly inhabited by the player during VR gameplay may in other embodiments be stylized environments that differ significantly from reality.

Social Network System and Game Networking Systems

FIG. 1 illustrates an example of a system for implementing various disclosed embodiments. In particular embodiments, system 100 comprises player 101, social networking system 120*a*, game networking system 120*b* (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120*a* (i.e. social network system) is a network-addressable computing system that can host one or more social graphs. Social networking system 120*a* can generate, store, receive, and transmit social networking data. Social networking system 120*a* can be accessed by the other components of system 100 either directly or via network 160. Game networking system 120*b* is a network-addressable computing system that can host one or more online games. Game networking system 120*b* can generate, store, receive, and transmit game-related data, such as, for example, game account data, game input, game state data, and game displays. Game networking system 120*b* can be accessed by the other components of system 100 either directly or via network 160. Player 101 may use client system 130 to access, send data to, and receive data from social networking system 120*a* and game networking system 120*b*. Client system 130 can access social networking system 120*a* or game networking system 120*b* directly, via network 160, or via a third-party system. As an example and not by way of limitation, client system 130 may access game networking system 120*b* via social networking system 120*a*. Client system 130 can be any suitable computing device, such as a personal computer, laptop, cellular phone, smart phone, computing tablet, etc.

Although FIG. 1 illustrates a particular number of players 101, social network systems 120*a*, game networking systems 120*b*, client systems 130, and networks 160, this disclosure contemplates any suitable number of players 101, social network systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social networking system 120*a*, game networking system 120*b*, client system 130, and network 160, this disclosure contemplates any suitable arrangement of player 101, social networking system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WIMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, client system 130, and network 160, this disclosure contemplates any suitable connections between player 101, social networking system 120*a*, game networking system 120*b*, client system 130, and network 160. As an example and not by way of limitation, in particular embodiments, client system 130 may have a direct connection to social networking system 120*a* or game networking system 120*b*, bypassing network 160.

Online Games and Game Systems
  Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b* (i.e. online gaming system), which includes a Notification Generator 150 that performs operations according to embodiments as described herein. The game networking system 120*b* can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Storing Game-Related Data

A database may store any data relating to game play within a game networking system 120*b*. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system $120b$ may determine the player's friend preferences based on player attributes that the player's first-degree friends have in common, and may store these player attributes as friend preferences in the player profile. Furthermore, the game networking system $120b$ may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N–1 other users), they are deemed to be separated by N degrees of separation. This user would be a so-called "Nth-degree friend." As used herein, the term "fiend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
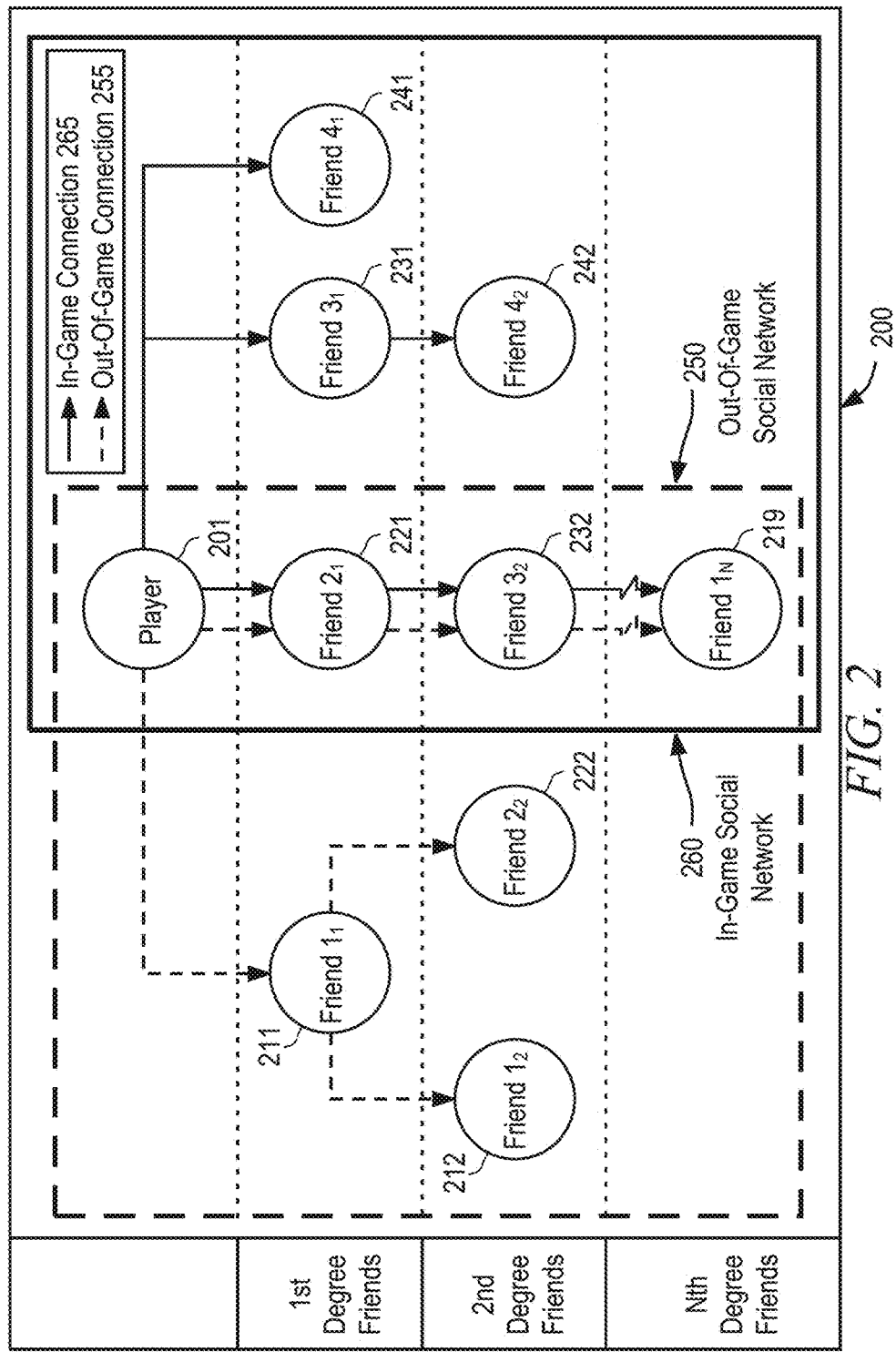
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user" and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to inter friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Clustering Engine

Figure 3:
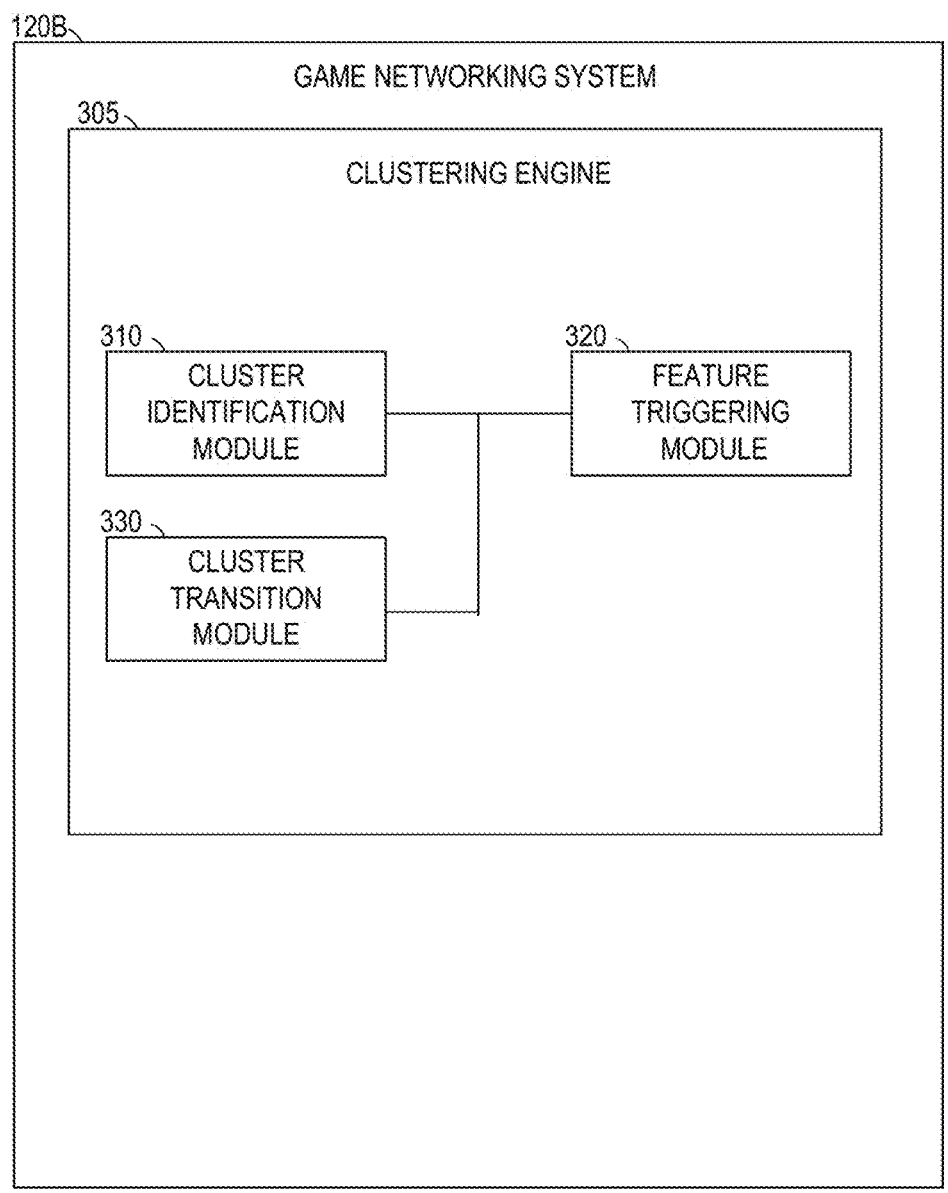
FIG. 3 is a block diagram illustrating components of a computing device, according to some example embodiments.

FIG. 3 is a block diagram illustrating components of a game networking system, according to some example embodiments. The game networking system 120b includes Clustering Engine 305. The Clustering Engine 305 includes a Cluster Identification Module 310, a Feature Triggering Module 320 and a Cluster Transition Module 330.

In various example embodiments, the Cluster Identification Module 310 is a hardware-implemented module that controls, manages and stores information related to monitoring actions of a plurality of users to determine various clusters to which each user belongs.

In various example embodiments, the Feature Triggering Module 320 is a hardware-implemented module that controls, manages and stores information related to triggering features from a parameter space that corresponds with a user's cluster.

In various example embodiments, the Cluster Transition Module 330 is a hardware-implemented module that controls, manages and stores information related to detecting when a user's subsequent actions indicates the user has transitioned from one cluster to a different cluster.

The modules 310-330 are configured to communicate with each other (e.g., via a bus, shared memory, or a switch). Any one or more of the modules 310-330 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
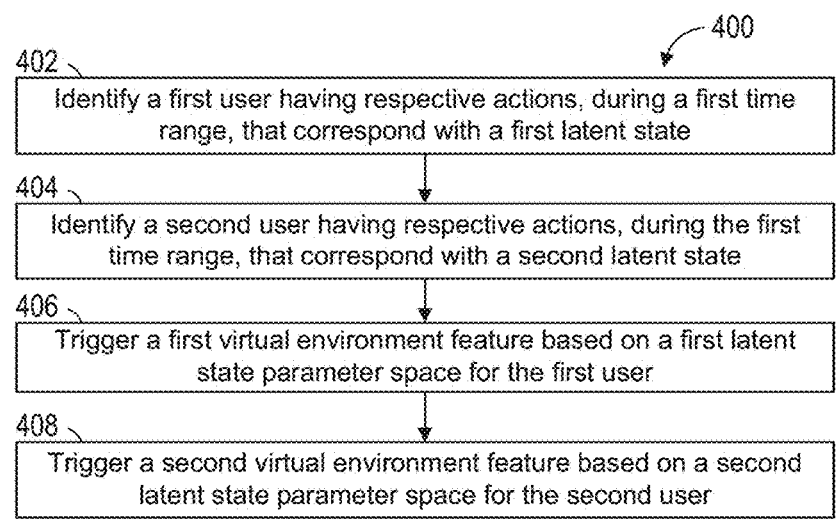
FIG. 4 is a flowchart showing an example method for customizing a user's experience, according to some example embodiments.

FIG. 4 is a flowchart 400 showing an example method for customizing a user's experience, according to some example embodiments.

The Clustering Engine 305 determines clusters of players (or users) that qualify as having one of the following predefined latent states: an aggressive latent state, a defensive latent state, and a moderate latent state. The Clustering Engine 305 triggers features from a cluster-specific parameter space for a player based on the player's current cluster. As the player's current latent state is identified based on a current pattern of game actions during a given time range, the Clustering Engine 305 triggers features for the player based on a latent state cluster that correspond with the player's current pattern of actions.

At operation 402, the Clustering Engine 305 identifies a first user having respective actions, during a first time range, in a virtual environment that correspond with a first latent state. At operation 404, the Clustering Engine 305 identifies a second user having respective actions, during the first time range, in a virtual environment that correspond with a second latent state.

In one embodiment, a first latent state can be labeled as "aggressive," which includes game actions that result in attempts to make progress within a virtual environment. Such game actions that correspond with an "aggressive" latent state include, but are not limited to: confronting (or attacking) opponent players, attempting to clear obstacles, completing levels, etc. A second latent state can be labeled as "defensive," which includes game actions that result in attempts to acquire resources within the virtual environment. Such game actions that correspond with a "defensive" latent state include, but are not limited to: purchasing assets, storing assets, increasing health indicators, etc. A third latent state can be labeled as "moderate," which includes game actions that are a defined (but updateable) mixture of game actions that correspond with the first and second latent states.

At operation 406, the Clustering Engine 305 triggers a first virtual environment feature based on a first latent state parameter space for the first user. At operation 408, the Clustering Engine 305 triggers a second virtual environment feature based on a second latent state parameter space for the second user.

The Clustering Engine 305 also detects when a player transitions between different types of latent states. That is, as an example, the Clustering Engine 305 detects that a player that once belonged to the "aggressive" latent state cluster has a pattern of subsequent game actions that corresponds with the "moderate" latent state. As such, the Clustering Engine 305 triggers features from a parameter space that correspond with the "moderate" latent state.

The Clustering Engine 305 further identifies the player is performing a pattern of subsequent actions, during a second time range, in the virtual environment that correspond with the second latent state. The Clustering Engine 305 triggers the second virtual environment feature based on the second latent state parameter space for the first user.

In one example, for a player with an "aggressive" latent state, the Clustering Engine 305 triggers features that belong to an "aggressive" latent state parameter space, such as prompting the player to create a league with other players, triggering the initiation of new challenges for the player to attempt, and providing an opportunity for the player to make purchases for in-game assets that are useful for making progress in the virtual environment.

In one example, for a player with a "defensive" latent state, the Clustering Engine 305 triggers features that belong to a "defensive" latent state parameter space, such as providing limited edition resources/supplies, modifying one or more aspects of the virtual environment to make progress through the virtual environment easier for the "defensive" player and providing asset recommendations.

In one example, for a player with a "moderate" latent state, the Clustering Engine 305 triggers a mixture of features from the "aggressive" latent state parameter space and the "defensive" latent state parameter space.

In some embodiments, particular GUI features are automatically surfaced or removed corresponding the current identified latent state of the player.

In one example embodiment, the Clustering Engine 305 includes one or more computer instructions that assigns $X_{it}=[X_{it1}, \ldots, X_{itD}]^T$ as measurements of player i at the t-th time epoch, where D is the number of features, wherein time is discrete and advances in epochs. The measurements of player i from t=1 to t=T, i.e. its time series of actions in the game, is denoted as $X_i=[X_{i1}, \ldots, X_{iT}]^T$. The time series of data for N players, is denoted by $X=\{X_1, \ldots, X_N\}$. It is understood that for different users, the total time epochs may not be the same.

As described above, a latent playing state controls a user's behavior at each time period, and that furthermore the state evolves as the player changes game action strategy over time. In one embodiment, the Clustering Engine 305 can represent each player's data using encoded rules for executing one or more of behaviors (or results) of a Hidden Markov Model (HMM) chain with length T, the total time epochs. Where $Y_{it}$ signifies the hidden state representing the i-th gamer's latent state at time t, and $Y_{it}$ will be regarded as discrete taking on S values $\{1, \ldots, S\}$.

The mechanism of the players HMM model implemented by the Clustering Engine 305 is as follows: 1) initially, a player starts with state $Y_{i1} \in \{1, \ldots, S\}$ according to an initial distribution $\pi$, with $\pi_s$ being the probability of starting at state s; 2) all the $Y_{it}$'s evolves according to the Markov property: given $Y_{it-1}$, the state $Y_{it}$ is independent of all the states prior to t-1, and the transition matrix is A, with $A_{rs}$ being the probability of transitioning from state r to state t; 3) at each time t, the observations $X_{it}$ only depends on the state $Y_{it}$ parametrized by B, with $B_s$ controlling the probability of observing $X_{it}$ at state $Y_{it}=s$. Given the observed data X and the number of states S, the Clustering Engine 305 estimates the parameters, i.e., the transition matrix A, the emission matrix B, and the initial distribution $\pi$ by maximizing the likelihood of the observations. As usual, the free parameter S is fitted via a scoring function.

After estimating the parameters, the Clustering Engine 305 determines the state sequence $Y_{i1}, \ldots, Y_{iT}$ for each user by maximizing $P(Y_{i1}, \ldots, Y_{iT}|X, \pi, A, B)$ using, for example, the Viterbi algorithm. As discussed, clustering by the Clustering Engine 305 consists in adapting the method proposed above and further considering clustering time series of integer data (albeit in a completely different domain). The Clustering Engine 305 adopts the mixture of Dirichlet process model (DP) for clustering. Thus, clusters evolve according to a Dirichlet distribution with parameter $\alpha$.

For example, the Clustering Engine 305 assigns $Y=[Y_1, \ldots, Y_N]^T$ to be the state transitions for all the players, where $Y_i=[Y_{i1}, \ldots, Y_{iT}]^T$ denotes the i-th player's states from 1 to the T-th time. The Clustering Engine 305 uses $Z_i$ as an auxiliary variable denoting the cluster assignment for the i-th player. The Clustering Engine 305 uses K as the total number of (unknown) clusters. Again, the number of clusters will be fitted automatically as part of the model, and will be continuously updated as more data is collected.

Each cluster k generates a Markov chain parametrized by $\{\lambda^k, \Phi^k\}$, where $\lambda^k$ is the S vector for the initial state distribution, and $\Phi^k$ is the S×S transition matrix. The Clustering Engine 305 uses the prior distribution for parameters in each cluster as $G_0(\{\lambda^k, \Phi^k\})=Dir(\hat{\pi}) \pi_{s=1}^S Dir(\hat{B}_s)$, where $\hat{\pi}$ and $\hat{B}$ are the estimated parameters at the first step. The conditional probability $$P(\{\lambda^k, \Phi^k\}_{k=1}^K | Z) = \pi_k G_0(\{\lambda^k, \Phi^k\}). \quad (1)$$

Given the clustering model of the Clustering Engine 305, the likelihood of the data of state transitions for all players is $$P(Y|Z, \{\lambda^k, \Phi^k\}_{k=1}^K) = \prod_{i=1}^N \left( \prod_{s=1}^S \lambda_s^{1[Y_{i1}=s]} \prod_{r=1}^S (\Phi_{rs}^{Z_i})^{n_{irs}} \right), \quad (2)$$

where $1[.]$ is the indicator function, and $n_{irs}$ is the number of transitions from state r to state s for the i-th player.

The Clustering Engine 305 includes one or more encoded computer instructions that, when executed, calculate results of a Bayesian approach for inference, and even though some parts can be done in closed form, the Clustering Engine 305 executes sampling methods for computing the posterior. The Clustering Engine 305 uses a collapsed-space sampling method to obtain samples from the reduced-spaced posterior distribution $P(Z|Y)$, instead of the full-space distribution $P(Z, \{\lambda, \Phi\}|Y)$. This allows for easy sampling steps and faster convergence rate. The reduced-space posterior distribution is $P(Z|Y) \propto P(Z,Y)=P(Y|Z)P(Z)$.

The likelihood $P(Y|Z)$ can be computed by integrating out the cluster-specific parameters $\{\lambda^k, \Phi^k\}_{k=1}^K$. Substituting (1) and (2), the Clustering Engine 305s obtains:

$$P(Y|Z) = \int P(Y|Z, \{\lambda^k, \Phi^k\}_{k=1}^K) P(\lambda^k, \Phi^k | Z) d\lambda^k d\Phi^k$$

$$= \prod_{k=1}^K \left[ \frac{\prod_s \Gamma(\bar{\pi}_s) \Gamma\left(\sum_s \hat{\pi}_s\right)}{\Gamma\left(\sum_s \bar{\pi}_s\right) \prod_s \Gamma(\hat{\pi}_s)} \right] \times$$

$$\prod_{k=1}^K \prod_r \left[ \frac{\prod_s \Gamma(\bar{B}_{rs}) \Gamma\left(\sum_s \hat{B}_{rs}\right)}{\Gamma\left(\sum_s \bar{B}_{rs}\right) \prod_s \Gamma(\hat{B}_{rs})} \right],$$

where $\bar{\pi}_s = \hat{\pi}_s + \Sigma_i 1[Z_i=k, Y_{i1}=s]$, and $\bar{B}_{rs} = \hat{B}_{rs} + \Sigma_i n_{irs} \cdot 1[Z_i=K]$.

Sampling Z from Dirichlet distribution can be equivalently done by the Clustering Engine 305s as below: set $Z_1=1$; for subsequent players, sample $Z_i$ according to the following distribution $$P(Z_i = k | Z_1, \ldots, Z_{i-1}) = \frac{|i' < i : Z_{i'} = k|}{i-1+\alpha}, \text{ for } k \in \{Z_{i'}\}_{i'<i}$$

$$P(Z_i = Z_{i'}, \forall i' < i | Z_1, \ldots, Z_{i-1}) = \frac{\alpha}{i-1+\alpha},$$

where denotes the number of elements in a set.

In one embodiment, the Clustering Engine 305 is implemented within an online strategy game where the goal is to conquer all the battlefields in a global map (players can play against other players or against the game itself). The players need to build/upgrade base resources with weapons and troops, which in turn requires game points that can be obtained from winning battles. Thus, players need to tradeoff between building resources and conquering battlefields.

The Clustering Engine 305 subsamples players from, for example, a dataset of 10 consecutive days data after installation. Such subsampling can result in 1719 players. Each player is characterized with 67 features at each day, and the Clustering Engine 305 selects 5 important features based on prior experience and feature selection methods: PvP (people vs people battle), Pve (people vs machine battle), Points (number of points gained), Session (number of session started), LevelUp (whether a player level up) and isPayer (whether the player paid). The Clustering Engine 305 includes one or more computer instructions that, when executed, perform one or more calculation that model Points with Gaussian distribution, Session with Poisson distribution, and the rest of the features with Bernoulli distribution. It is further understood that the Clustering Engine 305 includes one or more encoded rules (or computerized instructions) to calculate any of the equations, operations or modeling described herein.

As illustrated in FIG. 5, the Clustering Engine 305 identifies 3 latent states interpretable given the distributional characteristics of the features (see "Table 1" 505 of data record 500): Aggressive, Defensive, and Moderate. The Aggressive state captures the mode where the players focus on conquering battles, while the Defensive state describes the stage that they build the resources. The Moderate is a mixture of the two (i.e. a mixture of the Aggressive state and the Defensive state).

Figure 6:
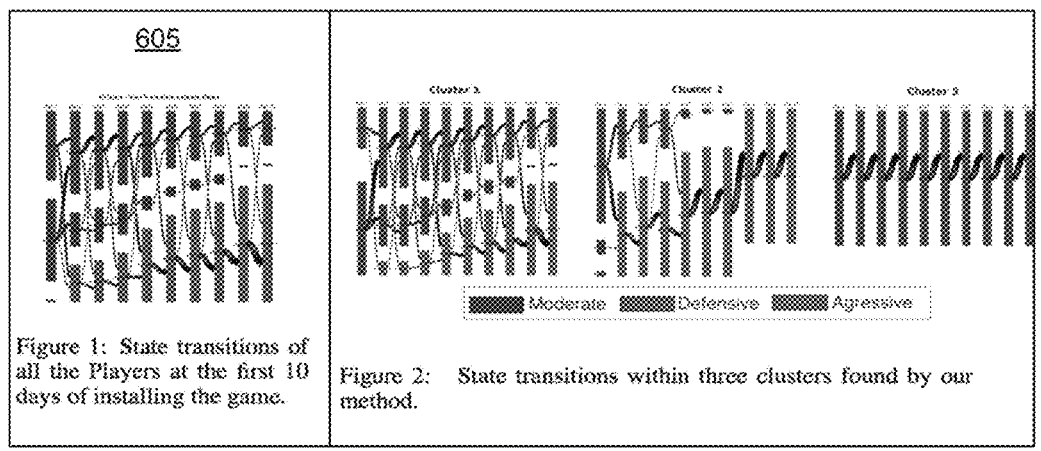
FIG. 6 illustrates a data record listing latent state transitions of a plurality of players as measured from game installation, according to some example embodiments.

As shown in FIG. 6, the Clustering Engine 305 plots the transitions for all the players among the 10 days (decoded using Viterbi) (see "Table 1" 605 of data record 600). The results shows that most of the users starts with the Moderate or Defensive state, and then gradually transition to the Aggressive state. This is consistent with initial game design as it is difficult for players to start with many battles due to resource restrictions, but they ultimately need to become aggressive and conquer all the battlefields.

Data Flow

Figure 7:
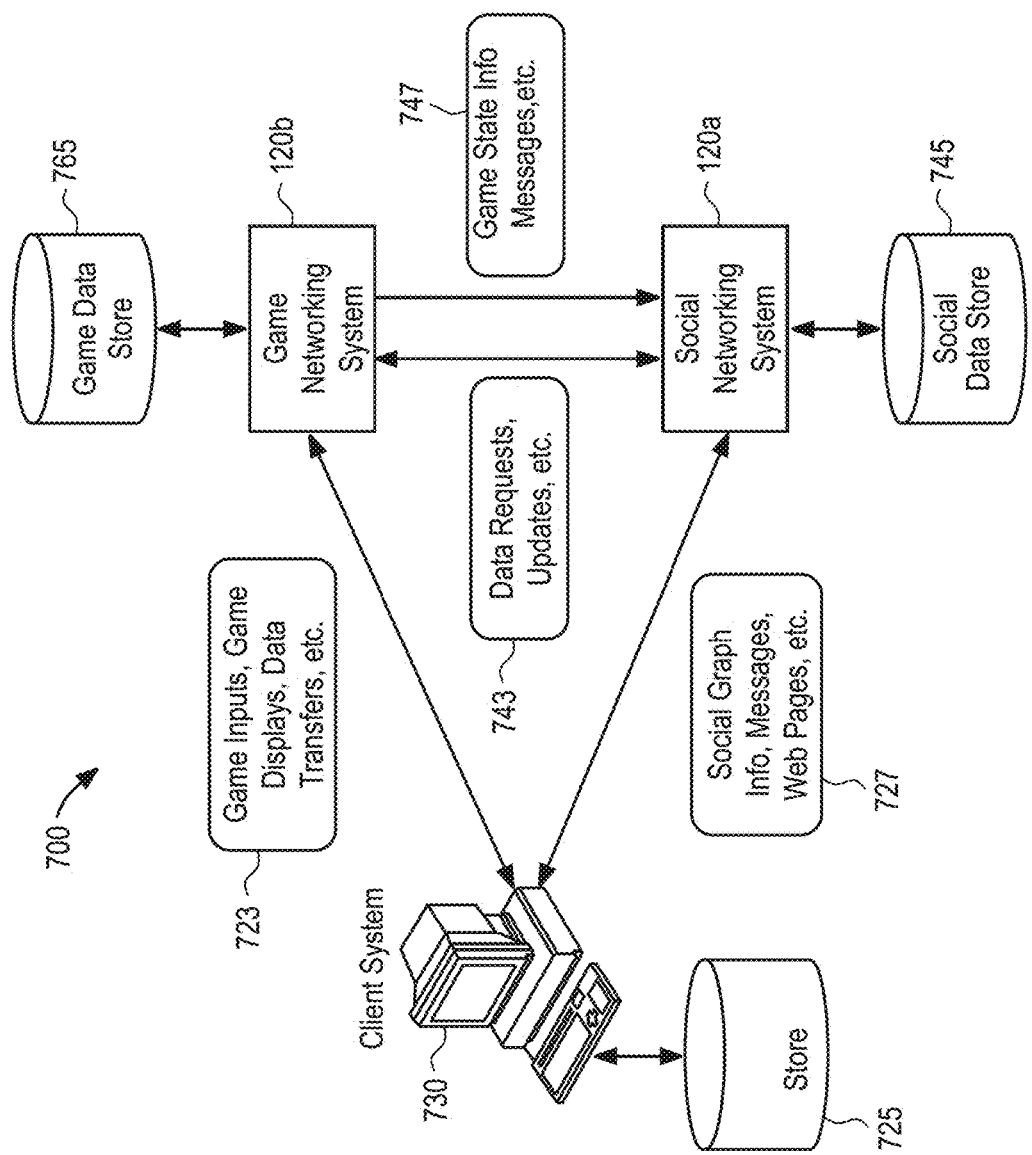
FIG. 7 is a diagrammatic representation of an example data flow between example components of the example system of FIG. 1, according to some example embodiments.

FIG. 7 illustrates an example data flow between the components of system 700. In particular embodiments, system 700 can include client system 730, social networking system 120*a* (i.e. social network system), and game networking system 120*b* (i.e. online game system system). The components of system 700 can be connected to each other in any suitable configuration, using any suitable type of connection. The components may be connected directly or over any suitable network. Client system 7, social networking system 120*a*, and game networking system 120*bb* can each have one or more corresponding data stores such as local data store 735, social data store 745, and game data More 765, respectively. Social networking system 120*a* and game networking system 120*b* can also have one or more servers that can communicate with client system 730 over an appropriate network. Social networking system 120*a* and game networking system 120*b* can have, for example, one or more internet servers for communicating with client system 730 via the Internet. Similarly, social networking system 120*a* and game networking system 120*b* can have one or more mobile servers for communicating with client system 730 via a mobile network (e.g., GSM, PCS, Wi-Fi, WPAN, etc.). In some embodiments, one server may be able to communicate with client system 730 over both the Internet and a mobile network. In other embodiments, separate servers can be used.

Client system 730 can receive and transmit data 723 to and from game networking system 120*b*. This data can include, for example, webpages, messages, game inputs, game displays, HTTP packets, data requests, transaction information, updates, and other suitable data. At some other time, or at the same time, game networking system 120*b* can communicate data 743, 747 (e.g., game state information, game system account information, page info, messages, data requests, updates, etc.) with other networking systems, such as social networking system 120*a* (e.g., Facebook, Myspace, etc.). Client system 730 can also receive and transmit data 727 to and from social networking system 120*a*. This data can include, for example, webpages, messages, social graph information, social network displays, HTTP packets, data requests, transaction information, updates, and other suitable data.

Communication between client system 730, social networking system 120*a*, and game networking system 120*b* can occur over any appropriate electronic communication medium or network using any suitable communications protocols. For example, client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and Action Script, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120*b*, the BLOB containing the game state for the instance corresponding to the player can be transmitted to client system 730 for use by a client-side executed object to process. In particular embodiments, the client-side executable may be a FLASH-based game, which can de-serialize the game state data in the BLOB. As a player plays the game, the game logic implemented at client system 730 maintains and modifies the various game state parameters locally. The client-side game logic may also batch game events, such as mouse clicks, and transmit these events to game networking system 120*b*. Game networking system 120*b* may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 730. At any given time, there may be multiple players at multiple client systems 730 all playing the same online game. In practice, the number of players playing the same game at the same time may be very large. As the game progresses with each player, multiple players may provide different inputs to the online game at their respective client systems 730, and multiple client systems 730 may transmit multiple player inputs and/or game events to game networking system 120b for further processing. In addition, multiple client systems 730 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 730. As an example and not by way of limitation, a client application downloaded to client system 730 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 730, either caused by an action of a game player or by the game logic itself, client system 730 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 700 is discussed in reference to updating a multi-player online game hosted on a network-addressable system (such as, for example, social networking system 120a or game networking system 120b), where an instance of the online game is executed remotely on a client system 730, which then transmits application event data to the hosting system such that the remote game server synchronizes game state associated with the instance executed by the client system 730.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 730 may include a Flash client. The Flash client may be configured to receive and run Flash application or game object code from any suitable networking system (such as, for example, social networking system 120a or game networking system 120b). In particular embodiments, the Flash client may be run in a browser client executed on client system 730. A player can interact with Flash objects using client system 430 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 730, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120b based on server loads or other factors. For example, client system 730 may send a batch file to game networking system 120b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 730. In particular embodiments, the batch file may be a text file and the name-value pairs may be in string format.

In particular embodiments, when a player plays an online game on client system 730, game networking system 120b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120b may retrieve the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 8:
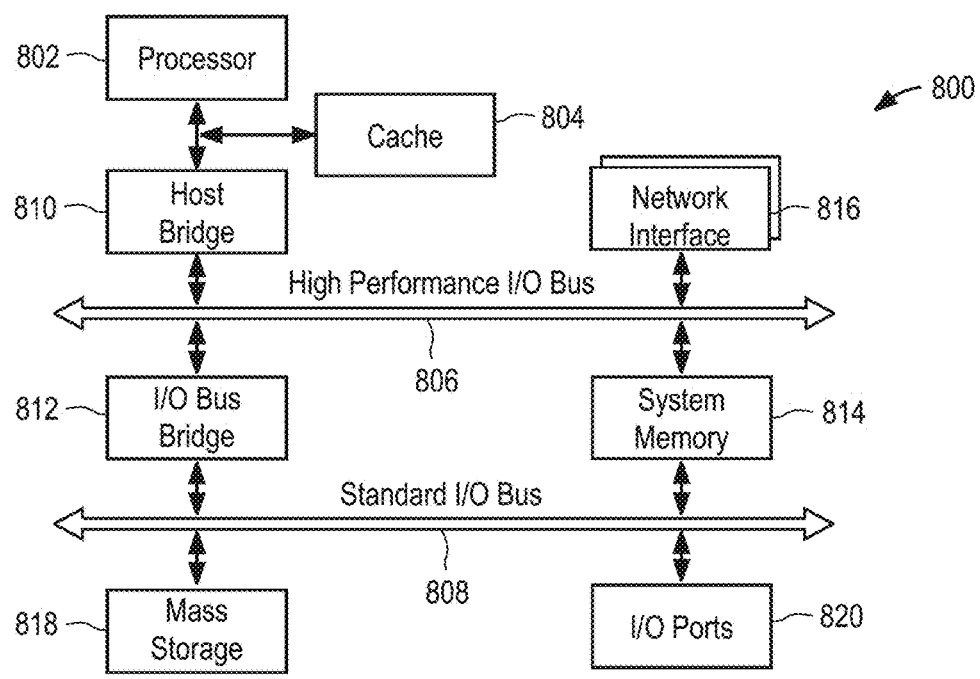
FIG. 8 illustrates an example computing system architecture, which may be used to implement a server or a client system illustrated in FIG. 9, according to some example embodiments.
Figure 9:
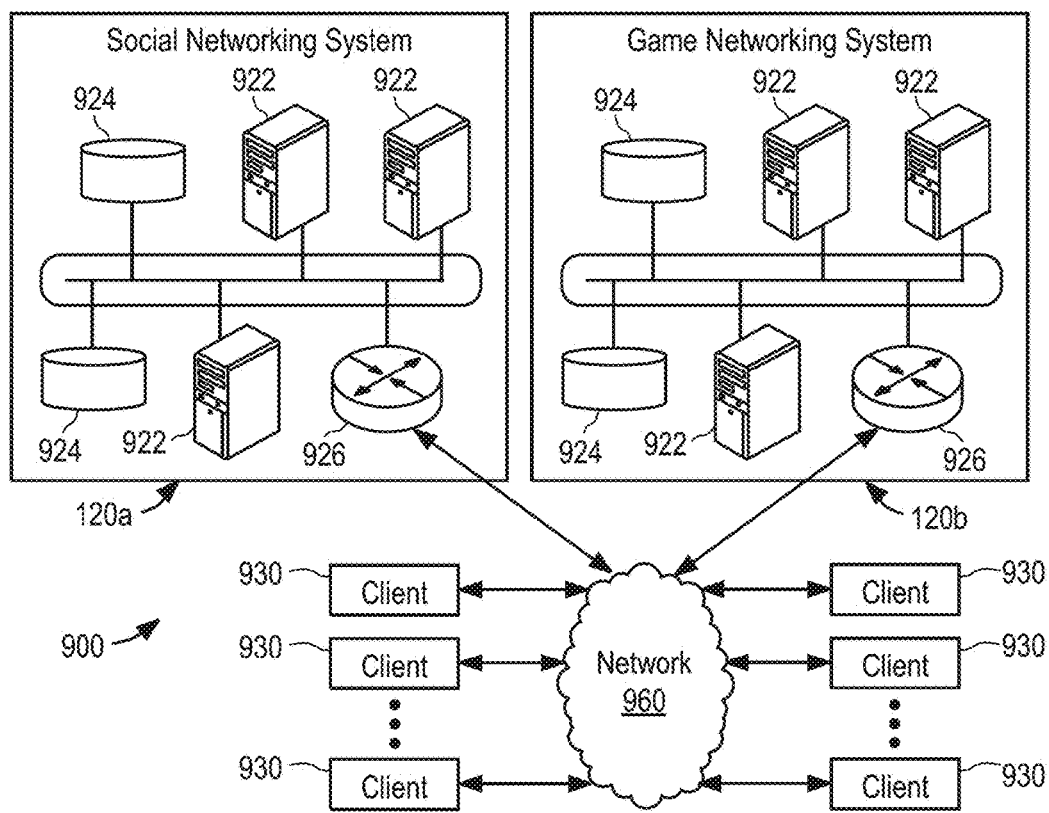
FIG. 9 illustrates an example network environment, in which various example embodiments may operate.

FIG. 8 illustrates an example computing system architecture, which may be used to implement a server 922 or a client system 930 illustrated in FIG. 9. In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 808. A host bridge 810 may couple processor 802 to high performance I/O bus 806, whereas I/O bus bridge 812 couples the two buses 806 and 808 to each other. A system memory 814 and one or more network/communication interfaces 816 may couple to bus 806. Hardware system 800 may further include video memory (not shown) and a display device coupled to the video memory. Mass storage 818 and I/O ports 820 may couple to bus 808. Hardware system 800 may optionally include a keyboard, a pointing device, and a display device (not shown) coupled to bus 808. Collectively, these elements are intended to represent a broad category of computer hardware systems, including but not limited to general purpose computer systems based on the ×86-compatible processors manufactured by Intel Corporation of Santa Clara, Calif., and the ×86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in servers 1022, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present disclosure may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 9 illustrates an example network environment, in which various example embodiments may operate. Network cloud 960 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 9 illustrates, particular embodiments may operate in a network environment comprising one or more networking systems, such as social networking system 120a, game networking system 120b, and one or more client systems 930. The components of social networking system 120a and game networking system 120b operate analogously; as such, hereinafter they may be referred to simply at networking system 920. Client systems 930 are operably connected to the network environment via a network service provider, a wireless carrier, or any other suitable means.

Networking system 120 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif, graphics (vector-based or bitmap), audio, video (e.g., mpeg), or other multimedia, and combinations thereof. Content object data may also include executable code objects e.g., games executable within a browser window or frame), podcasts, etc. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document Sequence Generator or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer system, comprising:
    a processor;
    a memory device holding an instruction set executable on the processor to cause the computer systems to perform operations comprising:
        in a computer-implement multiplayer online game, clustering players in a plurality of latent states corresponding to different respective patterns of gameplay behavior, each of the plurality of latent states having associated therewith a respective latent state parameter space including respective virtual environment features;
        determining that respective actions; performed in a first instance of a virtual environment by a first user during a first time range, correspond to a first one of the plurality of latent states;
        determining that respective actions, performed in a second instance of the virtual environment by a second user during the first time range, correspond to a second one of the plurality of latent states;
        responsive to determining that the actions of the first player correspond to the first latent state, triggering a first virtual environment feature based on a first latent state parameter space for the first user by surfacing in a graphical user interface (GUI) of the game for the first player a GUI feature particular to the first latent state; and
        responsive to determining that the actions of the second player correspond to the second latent state, triggering a second virtual environment feature based on a second latent state parameter space for the second user by surfacing in a graphical user interface of the game for the second player a GUI feature particular to the second latent state, the second virtual environment feature differing from the first virtual environment feature.

2. The computer system of claim 1, wherein the instructions further configure the processor to perform operations comprising:
    determining that subsequent actions, performed in the first instance of the virtual environment by the first user during a second time range, correspond with the second latent state; and
    triggering the second virtual environment feature based on the second latent state parameter space for the first user.

3. The computer system of claim 1, wherein the pattern of gameplay behavior of the first latent state corresponds with aggressive behavior, the determining that the respective actions, performed in the first instance of the virtual environment by the first user during the first time range, correspond with the first latent state comprises:
    detecting a pattern of respective aggressive game actions by the first player during the first time range.

4. The computer system of claim 3, wherein each respective aggressive game action comprises any one of: a game action to attack an opponent player, and a game action to attempt to clear a game obstacle and a game action that triggers completion of a game level.

5. The computer system of claim 3, wherein virtual environment features forming part of the first latent state parameter space and triggered responsive to determining that the actions of the first player corresponds to the first latent state comprises one or more of:
    a prompt for the first player to create a league with at least one other player,
    a new game challenge for the first player to attempt, and
    an offer for the first player to make at least one purchase for an in-game asset having a function that for making progress in the virtual environment.

6. The computer system of claim 1, wherein the pattern of gameplay behavior of the first latent state corresponds with aggressive behavior, the determining that the respective actions, performed in the first instance of the virtual environment by the first user during the first time range, correspond with the first latent state comprises:
    detecting a pattern of respective defensive game actions by the first player during the first time range.

7. The computer system of claim 6, wherein each respective defensive game action comprises any of: a game action for purchase of an asset, a game action for storage of an asset, and a game action that results in an increase of a health indicator.

8. The computer system of claim 6, wherein virtual environment features forming part of the first latent state parameter space and triggered responsive to determining that the actions of the first player corresponds to the first latent state comprises one or more of:
    an offer to acquire a resource that is in limited supply, and
    a modification of game logic of the virtual environment to assist the first player to progress through the virtual environment, an asset recommendation.

9. The computer system of claim 1, wherein the pattern of gameplay behavior of the first latent state corresponds with moderate behavior relative to aggressive behavior and defensive behavior defined with respect to others of the plurality of latent states, the determining that the respective actions, performed in the first instance of the virtual environment by the first user during the first time range, correspond with the first latent state comprises:
  detecting a pattern of respective moderate game actions by the first player during the first time range.

10. A non-transitory computer-readable medium storing executable instructions thereon, which, when executed by a processor, cause the processor to perform operations including:
  in a computer-implement multiplayer online game, clustering players in a plurality of latent states corresponding to different respective patterns of gameplay behavior, each of the plurality of latent states having associated therewith a respective latent state parameter space including respective virtual environment features;
  determining that respective actions, performed in a first instance of a virtual environment by a first user during a first time range, correspond to a first one of the plurality of latent states;
  determining that respective actions, performed in a second instance of the virtual environment by a second user during the first time range, correspond to a second one of the plurality of latent states;
  responsive to determining that the actions of the first player correspond to the first latent state, triggering a first virtual environment feature based on a first latent state parameter space for the first user by surfacing in a graphical user interface (GUI) of the game for the first player a GUI feature particular to the first latent state; and
  responsive to determining that the actions of the second player correspond to the second latent state, triggering a second virtual environment feature based on a second latent state parameter space for the second user by surfacing in a graphical user interface of the game for the second player a GUI feature particular to the second latent state, the second virtual environment feature differing from the first virtual environment feature.

11. The non-transitory computer-readable medium of claim 10, wherein the instructions further cause the processor to perform operations comprising:
  determining that subsequent actions, performed in the first instance of the virtual environment by the first user during a second time range, correspond with the second latent state; and
  triggering the second virtual environment feature based on the second latent state parameter space for the first user.

12. The non-transitory computer-readable medium of claim 10; wherein the pattern of gameplay behavior of the first latent state corresponds with aggressive behavior, the determining that the respective actions, performed in the first instance of the virtual environment by the first user during the first time range, correspond with the first latent state comprises:
  detecting a pattern of respective aggressive game actions by the first player during the first time range.

13. The non-transitory computer-readable medium of claim 12, wherein each respective aggressive game action comprises any one of: a game action to attack an opponent player, and a game action to attempt to clear a game obstacle and a game action that triggers completion of a game level.

14. The non-transitory computer-readable medium of claim 12, wherein virtual environment features forming part of the first latent state parameter space and triggered responsive to determining that the actions of the first player corresponds to the first latent state comprises one or more of:
  a prompt for the first player to create a league with at least one other player,
  a new game challenge for the first player to attempt, and
  an offer for the first player to make at least one purchase for an in-game asset having a function that for making progress in the virtual environment.

15. The non-transitory computer-readable medium of claim 10, wherein the pattern of gameplay behavior of the first latent state corresponds with aggressive behavior, the determining that the respective actions, performed in the first instance of the virtual environment by the first user during the first time range, correspond with the first latent state comprises:
  detecting a pattern of respective defensive game actions by the first player during the first time range.

16. The non-transitory computer-readable medium of claim 15, wherein each respective defensive game action comprises any of: a game action for purchase of an asset, a game action for storage of an asset, and a game action that results in an increase of a health indicator.

17. The non-transitory computer-readable medium of claim 15, wherein virtual environment features forming part of the first latent state parameter space and triggered responsive to determining that the actions of the first player corresponds to the first latent state comprises one or more of:
  an offer to acquire a resource that is in limited supply, and
  a modification of game logic of the virtual environment to assist the first player to progress through the virtual environment, an asset recommendation.

18. The non-transitory computer-readable medium of claim 10, wherein the pattern of gameplay behavior of the first latent state corresponds with moderate behavior relative to aggressive behavior and defensive behavior defined with respect to others of the plurality of latent states, the determining that the respective actions, performed in the first instance of the virtual environment by the first user during the first time range, correspond with the first latent state comprises:
  detecting a pattern of respective moderate game actions by the first player during the first time range.

19. A computer-implemented method comprising:
  in a computer-implement multiplayer online game, clustering players in a plurality of latent states corresponding to different respective patterns of gameplay behavior, each of the plurality of latent states having associated therewith a respective latent state parameter space including respective virtual environment features;
  determining that respective actions, performed in a first instance of a virtual environment by a first user during a first time range, correspond to a first one of the plurality of latent states;
  determining that respective actions, performed in a second instance of the virtual environment by a second user during the first time range, correspond to a second one of the plurality of latent states;
  responsive to determining that the actions of the first player correspond to the first latent state, triggering a first virtual environment feature based on a first latent state parameter space for the first user by surfacing in a graphical user interface (GUI) of the game for the first player a GUI feature particular to the first latent state; and
  responsive to determining that the actions of the second player correspond to the second latent state triggering a second virtual environment feature based on a second latent state parameter space for the second user by surfacing in a graphical user interface of the game for the second player a GUI feature particular to the second latent state, the second virtual environment feature differing from the first virtual environment feature.

20. The computer-implemented method as in claim 19, further comprising:
  determining that subsequent actions, performed in the first instance of the virtual environment by the first user during a second time range, correspond with the second latent state; and
  triggering the second virtual environment feature based on the second latent state parameter space for the first user.

* * * * *

UNITED STATES PATENT AND TRADEMARK OFFICE
CERTIFICATE OF CORRECTION

PATENT NO. : 10,315,116 B2  
APPLICATION NO. : 15/288851  
DATED : June 11, 2019  
INVENTOR(S) : Ntoulas et al.

Page 1 of 2

It is certified that error appears in the above--identified patent and that said Letters Patent is hereby corrected as shown below:

In the Drawings

Sheet 7 of 9, Fig. 7, reference numeral 725, Line 1, delete "Store" and insert --Local Data Store-- therefor In the Specification In Column 4, Line 45, delete "System" and insert --Systems-- therefor In Column 5, Line 46, delete "(WIMAX))" and insert --(WiMAX))-- therefor In Column 6, Line 1, delete "Gaines" and insert --Games-- therefor In Column 9, Line 36, delete ""fiend"" and insert --"friend"-- therefor In Column 15, Line 44, delete "7," and insert --730,-- therefor In Column 15, Line 45, delete "120bb" and insert --120b-- therefor In Column 15, Line 47, delete "735," and insert --725,-- therefor In Column 15, Line 47, delete "More" and insert --store-- therefor In Column 16, Line 35, delete "Action Script," and insert --ActionScript,-- therefor In Column 18, Line 16, delete "430" and insert --730-- therefor In Column 19, Line 64, delete "1022," and insert --922,-- therefor In Column 21, Line 16, delete "gif," and insert --gif),-- therefor Signed and Sealed this  
Second Day of June, 2020

Andrei Iancu  
*Director of the United States Patent and Trademark Office*

In Column 21, Line 19, delete "e.g.," and insert --(e.g.,-- therefor

In the Claims

In Column 23, Line 49, in Claim 1, delete "actions;" and insert --actions,-- therefor In Column 25, Line 50, in Claim 12, delete "claim 10;" and insert --claim 10,-- therefor In Column 26, Line 65, in Claim 19, delete "state" and insert --state,-- therefor